United States Patent
Izumi et al.

(10) Patent No.: US 10,493,423 B2
(45) Date of Patent: Dec. 3, 2019

(54) PURIFICATION TREATMENT METHOD OF LIQUID CONTAINING HARMFUL SUBSTANCE, AND PURIFICATION TREATMENT DEVICE OF LIQUID CONTAINING HARMFUL SUBSTANCE FOR CARRYING OUT SAID METHOD

(71) Applicants: FUTAMURA KAGAKU KABUSHIKI KAISHA, Aichi (JP); DAINICHISEIKA COLOR & CHEMICALS MFG. CO., LTD., Tokyo (JP)

(72) Inventors: Jun Izumi, Nagasaki (JP); Yusuke Ideta, Nagasaki (JP); Ryuta Nishide, Nagasaki (JP); Toru Kawakami, Tokyo (JP); Akira Nishio, Tokyo (JP); Seigo Miyashita, Tokyo (JP); Satoru Nakayasu, Tokyo (JP)

(73) Assignees: FUTAMURA KAGAKU KABUSHIKI KAISHA, Aichi (JP); DAINICHISEIKA COLOR & CHEMICALS MFG. CO., LTD., Tokyo (JP)

( * ) Notice: Subject to any disclaimer, the term of this patent is extended or adjusted under 35 U.S.C. 154(b) by 0 days.

(21) Appl. No.: 15/764,012

(22) PCT Filed: Feb. 4, 2016

(86) PCT No.: PCT/JP2016/053425
§ 371 (c)(1),
(2) Date: Mar. 28, 2018

(87) PCT Pub. No.: WO2017/056518
PCT Pub. Date: Apr. 6, 2017

(65) Prior Publication Data
US 2018/0280922 A1  Oct. 4, 2018

(30) Foreign Application Priority Data
Sep. 30, 2015  (JP) .................. 2015-194360

(51) Int. Cl.
*B01J 20/02* (2006.01)
*B01J 20/06* (2006.01)
(Continued)

(52) U.S. Cl.
CPC ....... *B01J 20/0225* (2013.01); *B01J 20/0237* (2013.01); *B01J 20/06* (2013.01);
(Continued)

(58) Field of Classification Search
None
See application file for complete search history.

(56) References Cited

U.S. PATENT DOCUMENTS

| 4,040,982 A | 8/1977 | Basila et al. |
| 6,403,031 B1 | 6/2002 | Escude et al. |

(Continued)

FOREIGN PATENT DOCUMENTS

| CN | 1894029 | 1/2007 |
| CN | 101522572 | 9/2009 |

(Continued)

OTHER PUBLICATIONS

International Search Report, issued in the corresponding PCT application No. PCT/JP2016/053425, dated Mar. 1, 2016, 4 pages.
(Continued)

*Primary Examiner* — Chester T Barry
(74) *Attorney, Agent, or Firm* — Hamre, Schumann, Mueller & Larson, P.C.

(57) ABSTRACT

The present invention provides a method for performing a purification treatment on a harmful substance-containing liquid, the method enabling an efficient purification treat-
(Continued)

ment of a harmful substance-containing liquid by using dissolved ozone being an oxidizing agent with high level of safety, and a harmful substance-containing liquid purification treatment apparatus for carrying out the method. A method for performing a purification treatment on a harmful substance-containing liquid, the method comprising adding and mixing dissolved ozone into a harmful substance-containing liquid containing a harmful substance, thereafter bringing the harmful substance-containing liquid into contact with a transition metal-containing oxide having a BET specific surface area of 80 $m^2/g$ or more, adsorbing ozone, and adsorbing a harmful substance, and then allowing the harmful substance-containing liquid to flow to accelerate oxidation of the harmful substance by dissolved ozone, thereby performing a highly efficient oxidative decomposition, and a harmful substance-containing liquid purification treatment apparatus for carrying out the method.

9 Claims, 2 Drawing Sheets

(51) Int. Cl.
| | |
|---|---|
| B01J 20/10 | (2006.01) |
| C02F 1/78 | (2006.01) |
| B01J 20/18 | (2006.01) |
| B01J 20/28 | (2006.01) |
| C02F 1/28 | (2006.01) |
| C02F 1/72 | (2006.01) |
| B01J 20/30 | (2006.01) |
| B01J 20/32 | (2006.01) |
| B01J 37/03 | (2006.01) |
| B01J 37/06 | (2006.01) |
| B01J 23/889 | (2006.01) |
| B01J 23/75 | (2006.01) |
| B01J 29/08 | (2006.01) |
| B01J 29/10 | (2006.01) |
| B01J 29/16 | (2006.01) |
| B01J 35/04 | (2006.01) |
| B01J 35/10 | (2006.01) |
| B01J 37/00 | (2006.01) |
| B01J 37/02 | (2006.01) |
| C02F 101/30 | (2006.01) |
| C02F 103/08 | (2006.01) |
| C02F 101/16 | (2006.01) |
| C02F 101/32 | (2006.01) |
| C02F 101/36 | (2006.01) |

(52) U.S. Cl.
CPC .............. *B01J 20/10* (2013.01); *B01J 20/18* (2013.01); *B01J 20/28004* (2013.01); *B01J 20/28045* (2013.01); *B01J 20/28057* (2013.01); *B01J 20/28059* (2013.01); *B01J 20/28061* (2013.01); *B01J 20/28064* (2013.01); *B01J 20/28066* (2013.01); *B01J 20/3085* (2013.01); *B01J 20/3204* (2013.01); *B01J 20/3236* (2013.01); *B01J 23/75* (2013.01); *B01J 23/8892* (2013.01); *B01J 29/084* (2013.01); *B01J 29/106* (2013.01); *B01J 29/166* (2013.01); *B01J 35/04* (2013.01); *B01J 35/1019* (2013.01); *B01J 37/0009* (2013.01); *B01J 37/0201* (2013.01); *B01J 37/031* (2013.01); *B01J 37/06* (2013.01); *C02F 1/281* (2013.01); *C02F 1/288* (2013.01); *C02F 1/725* (2013.01); *C02F 1/78* (2013.01); *C02F 1/283* (2013.01); *C02F 2101/16* (2013.01); *C02F 2101/30* (2013.01); *C02F 2101/32* (2013.01); *C02F 2101/36* (2013.01); *C02F 2103/08* (2013.01); *C02F 2201/782* (2013.01); *C02F 2303/02* (2013.01); *C02F 2303/04* (2013.01); *C02F 2303/18* (2013.01)

(56) References Cited

U.S. PATENT DOCUMENTS

| | | | |
|---|---|---|---|
| 6,533,999 B1 | 3/2003 | Izumi et al. | |
| 7,833,316 B2 | 11/2010 | Tatarchuck et al. | |
| 2004/0175318 A1 | 9/2004 | Segawa et al. | |
| 2007/0020171 A1* | 1/2007 | Waki | B01J 3/008 423/599 |
| 2007/0128424 A1 | 6/2007 | Omori et al. | |
| 2008/0008937 A1* | 1/2008 | Eylem | H01M 2/16 429/218.1 |
| 2009/0261042 A1* | 10/2009 | Semiat | B01J 20/06 210/673 |
| 2010/0254868 A1 | 10/2010 | Obee et al. | |
| 2012/0024799 A1* | 2/2012 | Chen | B01J 20/0222 210/749 |
| 2014/0065047 A1 | 3/2014 | Hui et al. | |

FOREIGN PATENT DOCUMENTS

| | | | |
|---|---|---|---|
| EP | 0625482 | | 11/1994 |
| EP | 0913193 | | 5/1999 |
| JP | 07-318036 | | 12/1995 |
| JP | 09-056799 | | 3/1997 |
| JP | 09-299756 | | 11/1997 |
| JP | 11-104618 | | 4/1999 |
| JP | 11-342313 | | 12/1999 |
| JP | 2000-005563 | | 1/2000 |
| JP | 2000-005743 | | 1/2000 |
| JP | 2000-153152 | | 6/2000 |
| JP | 2001-149958 | | 6/2001 |
| JP | 2002-263439 | | 9/2002 |
| JP | 3377733 | | 2/2003 |
| JP | 3382854 | | 3/2003 |
| JP | 3382857 | | 3/2003 |
| JP | 3611278 | | 1/2005 |
| JP | 2007-125509 | | 5/2007 |
| JP | 2007222697 A | * | 9/2007 |
| JP | 2008-055312 | | 3/2008 |
| JP | 2008-284520 | | 11/2008 |
| JP | 2009-297629 | | 12/2009 |
| JP | 2010-094633 | | 4/2010 |
| JP | 2011-078885 | | 4/2011 |
| JP | 2011-078886 | | 4/2011 |
| JP | 2011-246799 | | 12/2011 |
| JP | 2011-246800 | | 12/2011 |
| JP | 6113891 | | 1/2013 |
| JP | 6113892 | | 1/2013 |
| JP | 2014-210251 | | 11/2014 |
| JP | 2014210251 A | * | 11/2014 |
| JP | 2015-174017 | | 10/2015 |
| JP | 2015-188823 | | 11/2015 |
| KR | 10-2006-0103447 | | 9/2006 |
| WO | 2005/056175 | | 6/2005 |
| WO | 2008/001354 | | 1/2008 |

OTHER PUBLICATIONS

Korean Office Action, issued in the corresponding Korean patent application No. 10-2018-7008566, dated Jan. 24, 2019, 18 pages (including machine translation).
International Search Report, issued in the corresponding PCT application No. PCT/JP2016/053424, dated Apr. 19, 2016, 5 pages.
Extended European Search Report, issued in the corresponding European patent application No. 16850695.4, dated Dec. 17, 2018, 6 pages.

(56) References Cited

OTHER PUBLICATIONS

Korean Office Action, issued in the corresponding Korean patent application No. 10-2018-7008563, dated Feb. 22, 2019, 14 pages with machine translation.
Extended European Search Report, issued in the corresponding European patent application No. 16850696.2, dated Mar. 22, 2019, 13 pages.
Hu et al., "Catalytic Ozonation of Herbicide 2,4-D over Cobalt Oxide Supported on Mesoporous Zirconia", Journal of Physical Chemistry C, vol. 112, No. 15, pp. 5978-5983, Apr. 1, 2008.
U.S. Appl. No. 15/761,512, filed Mar. 20, 2018, 2018/0264405.
Taiwanese Office Action, issued in the corresponding Taiwanese patent application No. 105104593, dated Jun. 19, 2019, 12 pages.
Japanese Office Action, issued in the corresponding Japanese patent application No. 2015-194360, dated Aug. 6, 2019, 67 pages (including full machine translations of the Office Action and the cited four Japanese patent references), the four Japanese patent references with English abstract and WO 2005/056175 and US patent document corresponding to WO '175 being previously submitted.
Second Korean Office Action, issued in the corresponding Korean patent application No. 10-2018-7008563, dated Sep. 5, 2019, 11 pages (including translation), the cited references being previously filed in IDS.
European Office Action, issued in the corresponding European patent application No. 16 850 695.4, dated Sep. 12, 2019, 5 pages, the cited references being previously filed in the IDS dated Apr. 12, 2019.

\* cited by examiner

PURIFICATION TREATMENT METHOD OF LIQUID CONTAINING HARMFUL SUBSTANCE, AND PURIFICATION TREATMENT DEVICE OF LIQUID CONTAINING HARMFUL SUBSTANCE FOR CARRYING OUT SAID METHOD

TECHNICAL FIELD

The present invention relates to a method for performing a detoxification treatment and a detoxification treatment apparatus for a liquid containing harmful substances such as various kinds of organic contaminants, malodorous components, and bacteria (hereinafter, referred to as harmful substance-containing liquid), and particularly to a method and an apparatus for performing a purification treatment on a harmful substance-containing liquid, wherein the efficiency of the detoxification by a treatment with dissolved ozone being an oxidizing agent with high level of safety is improved. The present invention is useful for a water supply or sewerage purification treatment, and freshwater or seawater purification in a culture water tank.

BACKGROUND ART

As one of the methods for performing a detoxification treatment on a contaminated liquid containing harmful substances such as organic contaminants, there exists a treatment making use of biological activity, but the processing speed thereof is slow because it depends on a biochemical reaction by a microorganism, in addition, a microorganism tank for decomposing the harmful substances is needed, and the operation/maintenance of the microorganism tank needs much attention and experience. The decomposition of a harmful substance such as an organic contaminant by a microorganism is generally performed through oxidation of the harmful substance in an aerobic atmosphere, but in the removal of ammonia being a malodorous component by a digesting bacterium, there remains a problem such as adjustment of pH after the oxidation of ammonia, or disposal of nitric acid. On the other hand, as one of the methods for performing a detoxification treatment on water containing harmful substances including malodorous components such as various kinds of COD components and ammonia in low concentrations, there exists a method for performing an oxidative decomposition treatment with ozone, and various proposals have been made in order to improve the efficiency of the treatment. For example, an oxidation treatment method with a mixed solution containing: a water-soluble oxidizing agent such as an oxygen-containing halogenated compound or hydrogen peroxide; and dissolved ozone has been attempted (Patent Literatures 1 and 2), but the rate of reaction between a harmful substance in a low concentration and the water-soluble oxidizing agent or the mixed solution containing the water-soluble oxidizing agent and dissolved ozone is not so large, and therefore the single use of the method has not been put into practical use yet. However, autolysis progresses in the mixed solution containing the water-soluble oxidizing agent and dissolved ozone, and therefore there is a small risk that the water-soluble oxidizing agent and dissolved ozone are left in a treated liquid to affect a human body, so that the mixed solution is anticipated to expand the field of application as a clean treating agent further in future, and when the mixed solution can be utilized as an oxidizing agent for treating a harmful substance-containing liquid, a method using the mixed solution is expected as a greatly effective treatment method.

In addition, with respect to the oxidative decomposition treatment of a harmful substance with dissolved ozone, there are proposals on a high silica adsorbent adsorbing a harmful substance and adsorbing ozone for the purpose of performing the oxidative decomposition treatment efficiently (Patent Literatures 3 and 4). Further, in recent years, there have been proposed a method and an apparatus for producing ozone water directly through electrolysis in place of a method for obtaining dissolved ozone through dissolution of an ozone gas, and it is described that the obtained ozone water can be utilized for decomposition of organic chlorine compounds containing dioxin or disposal of a waste liquid containing dioxin (Patent Literatures 5 and 6).

CITATION LIST

Patent Literature

Patent Literature 1: Japanese Patent Laid-Open No. 2008-55312
Patent Literature 2: Japanese Patent Laid-Open No. 2009-297629
Patent Literature 3: Japanese Patent No. 3377733
Patent Literature 4: Japanese Patent No. 3611278
Patent Literature 5: Japanese Patent No. 5113891
Patent Literature 6: Japanese Patent No. 5113892

SUMMARY OF INVENTION

Technical Problem

Under the above-described circumstances, the present inventors have recognized as follows. That is, the purification treatment with dissolved ozone is performed by injecting dissolved ozone into a harmful substance-containing liquid; however, the concentration of a harmful substance as an object of the treatment in the harmful substance-containing liquid is usually extremely low, and therefore autolysis of dissolved ozone progresses before dissolved ozone contributes to oxidative decomposition of the harmful substance, so that injection of excessive amount of dissolved ozone greatly exceeding the stoichiometric ratio is needed, which is not economical, and further, the injection of the excessive amount of dissolved ozone gives rise to the necessity of performing decomposition treatment on extra ozone afterward, which is also not economical. On top of the above-described point of view, the present inventors have recognized that it is often the case that the reaction rate of ozone oxidation is not so large although the reaction rate depends on the harmful substance as an object of treatment, therefore there is a problem that the efficiency of detoxification is low, and it is difficult to put a purification treatment with dissolved ozone into practical use unless these problems are not improved.

Accordingly, an object of the present invention is to provide a method for performing a purification treatment on a harmful substance-containing liquid, by which such problems of the conventional techniques can be solved, and a purification treatment can be performed efficiently on the harmful substance-containing liquid using dissolved ozone being an oxidizing agent with high level of safety, and to provide a harmful substance-containing liquid purification treatment apparatus for carrying out the method.

Solution to Problem

The above-described object is achieved by the present invention described below. That is, the present invention provides a method for performing a purification treatment on a harmful substance-containing liquid, the method comprising adding and mixing dissolved ozone into a harmful substance-containing liquid containing a harmful substance, thereafter bringing the harmful substance-containing liquid into contact with a transition metal-containing oxide having a BET specific surface area of 80 $m^2/g$ or more, adsorbing ozone, and adsorbing a harmful substance, and then allowing the harmful substance-containing liquid to flow to accelerate oxidation of the harmful substance by dissolved ozone, thereby performing a highly efficient oxidative decomposition.

Preferred embodiments of the method for performing a purification treatment on a harmful substance-containing liquid according to the present invention include as follows. The transition metal-containing oxide is an oxide of at least one selected from the group consisting of Co, Mn, and Cu, or a complex oxide of two or more selected from the group consisting of Co, Mn, and Cu; the transition metal-containing oxide is a complex oxide of Co, Mn, and Cu, or an oxide of Co; the transition metal-containing oxide is an ultrafine particle of a transition metal-containing oxide formed using a precipitate produced by mixing an aqueous solution of a salt of at least one metal selected from the group consisting of Co, Mn, and Cu, or a mixed aqueous solution of two or more metal salts the metals of which are selected from Co, Mn, and Cu with an alkaline solution; the transition metal-containing oxide has a shape of an ultrafine particle and is carried on a high silica adsorbent in a honeycomb form; the method further comprising: disposing a high silica adsorbent co-adsorbing the harmful substance and the dissolved ozone on an upstream side or a downstream side of the transition metal-containing oxide with which the harmful substance-containing liquid is allowed to flow to be brought into contact, bringing the harmful substance-containing liquid into contact with the high silica adsorbent, and allowing the harmful substance-containing liquid to flow; and the high silica adsorbent comprises any material selected from the group consisting of a high silica pentasil zeolite, a dealuminized faujasite, and a mesoporous silicate.

The present invention provides as another embodiment a harmful substance-containing liquid purification treatment apparatus for carrying out any of the above-described embodiments according to method for performing a purification treatment on a harmful substance, the apparatus comprising: an adsorbent-packed bed comprising at least the transition metal-containing oxide disposed therein in a form of a single substance or a mixture; a supply piping that supplies a harmful substance-containing liquid into the adsorbent-packed bed; a dissolved ozone generator that adds dissolved ozone into the harmful substance-containing liquid, the dissolved ozone generator connected to the supply piping; and a treated liquid discharge piping that discharges a treated liquid on which the purification treatment has been performed from the adsorbent-packed bed.

Preferred embodiments of the harmful substance-containing liquid purification treatment apparatus according to the present invention include that the form of a single substance or a mixture of the transition metal-containing oxide disposed inside the adsorbent-packed bed is anyone selected from the group consisting of an ultrafine particulate powder, a granular form, a pellet form, a Raschig ring form, and a honeycomb form.

Advantageous Effects of Invention

According to the method for performing a purification treatment on a harmful substance-containing liquid of the present invention, the effective utilization ratio of a dissolved ozone-containing mixed solution is improved to enable a high-processing speed and highly efficient water supply or sewerage purification treatment and freshwater or seawater purification in a culture water tank by using an adsorbent adsorbing dissolved ozone efficiently and adsorbing a harmful substance in a treatment of a harmful substance-containing liquid with dissolved ozone. In addition, the utilization ratio of the dissolved ozone-containing mixed solution (ratio of dissolved ozone-containing solution contributing to oxidation or the like of harmful substance) is improved, the ability of adsorbing the dissolved ozone-containing mixed solution is high, and therefore the amount of dissolved ozone that leaks to a treated liquid to be discharged is small, and further, the leakage of dissolved ozone can be prevented perfectly by providing a layer of a dissolved ozone decomposer such as activated carbon as necessary. Moreover, according to the apparatus of the present invention, a treatment on a harmful substance-containing liquid with dissolved ozone can be performed efficiently at a low operation cost.

DESCRIPTION OF EMBODIMENTS

The present invention will be described in detail giving preferred embodiments according to the present invention. In the method for performing a purification treatment on a harmful substance-containing liquid according to the present invention, the basic constitution includes (A) adding and mixing dissolved ozone into a harmful substance-containing liquid, (B) allowing the resultant mixed liquid to flow through a packed bed packed with a particular adsorbent adsorbing dissolved ozone and adsorbing a harmful substance, and (C) detoxifying the harmful substance in the liquid by the action of dissolved ozone, and in the basic constitution, the method for performing a purification treatment on a harmful substance-containing liquid according to the present invention is characterized in that a transition metal-containing oxide having a BET specific surface area of 80 $m^2/g$ or more is used as the adsorbent.

Examples of the harmful substance-containing liquid specified as an object of the treatment in the present invention include wastewater in which a measured value of a harmful substance shows a high value corresponding to a COD (chemical oxygen demand) regulation value specified by Environmental Agency, and water in a culture tank in which ammonia or the like being a malodorous substance is contained.

As the dissolved ozone-containing mixed solution generator (ozonizer) for supplying dissolved ozone for use in the present invention, any of publicly known silent discharge type, ultraviolet lamp type, and water electrolysis type ozonizers, and a recently proposed ozonizer that produces ozone water directly through electrolysis can be applied. As the method of adding dissolved ozone into a harmful substance-containing liquid, a method of mixing dissolved ozone into a harmful substance-containing liquid as an object of the treatment by sucking dissolved ozone into an ejector disposed on an upstream side and a method of injecting dissolved ozone into a harmful substance-containing liquid through gas-liquid contact by generating micro bubbles by a diffuser piping for gas-phase ozone inserted into a liquid phase are generally used. The amount of dissolved ozone to be added may be set appropriately according to the kind, concentration, and the like of the harmful substance in the harmful substance-containing liquid as the object of treatment and is 1 to 20 mol, preferably about 3 to about 10 mol based on 1 mol of the harmful substance in usual treatments of contaminated water or liquid which have been conventionally performed.

The adsorbent for use in the present invention is an adsorbent adsorbing dissolved ozone and adsorbing a harmful substance, and among such adsorbents, the adsorbent for use in the present invention is characterized in that it is a transition metal-containing oxide having a BET specific surface are of 80 $m^2/g$ or more. Examples of the preferred adsorbent for use in the present invention include a transition metal-containing oxide of at least one selected from the group consisting of Co, Mn, and Cu, or a complex oxide of two or more selected from the group consisting of Co, Mn, and Cu, and an ultrafine particle is particularly preferable.

As described previously, it is already known that the efficiency of the oxidative decomposition treatment of a harmful substance with dissolved ozone can be improved by using a high silica adsorbent adsorbing a harmful substance and adsorbing ozone. The present inventors have conducted diligent studies recognizing that even such a conventional technique is not sufficient, and further improvements in the efficiency of the oxidative decomposition treatment of a harmful substance with dissolved ozone are desired for putting the conventional technique into practical use, and, as a result, have reached the present invention. Specifically, the present inventors have found that the reaction rate of ozone oxidation is accelerated to make detoxification efficient by using a "transition metal-containing oxide having a BET specific surface area of 80 $m^2/g$ or more", which characterizes the present invention, and have thereby achieved the present invention. Further, since the transition metal-containing oxide that is suitable for the present invention is an ultrafine particle, the transition metal-containing oxide can be easily used with the high silica adsorbent which is proposed in conventional techniques and which adsorbs a harmful substance and adsorbs ozone, and it has been ascertained that further improvements in the efficiency of the oxidative decomposition treatment of a harmful substance with dissolved ozone can be achieved by constituting the method according to the present invention in this way.

The present inventors consider as follows with respect to the reason that the improvement of the efficiency of the oxidative decomposition treatment of a harmful substance with dissolved ozone can be achieved by using a "transition metal-containing oxide having a BET specific surface area of 80 $m^2/g$ or more", which characterizes the present invention. It is considered that the transition metal-containing oxide for use in the present invention functions as an adsorbent that adsorbs dissolved ozone and a harmful substance simultaneously, further, ozone and the harmful substance are concentrated in the adsorbent, and ozone is adsorbed without being decomposed in the crystal (or amorphous) structure of the adsorbent, so that the effect of efficiently performing oxidative decomposition on the harmful substance is exhibited. In this way, the adsorbent that characterizes the present invention has a high BET specific surface area, as high as 80 $m^2/g$ or more, and has a large number of adsorption sites, making it possible to realize a high capability of adsorbing ozone from dissolved ozone in a liquid, and besides, dissolved ozone itself that has been adsorbed has a low decomposition ratio in a mixed solution, and the adsorbent that characterizes the present invention also has a property of adsorbing the harmful substance, so that a stable treatment of the harmful substance through ozone oxidation in a liquid phase can be performed.

Hereinafter, a transition metal-containing oxide of at least one selected from the group consisting of Co, Mn, and Cu, or a complex oxide of two or more selected from the group consisting of Co, Mn, and Cu, which is useful as the adsorbent that characterizes the present invention, will be described. Specifically, description will be made taking a complex oxide comprising three kinds of Co, Mn, and Cu, and an oxide of Co as examples.

The complex oxide of Co, Mn, and Cu, which is suitable for the present invention, is preferably prepared by the wet process described below. The complex oxide prepared by such a method becomes an ultrafine particle having an average particle diameter of 0.1 μm or less, the BET specific surface area thereof easily becomes 80 $m^2/g$ or more. Firstly, an aqueous solution of a salt of Co, of a salt of Mn, and of a salt of Cu, and an aqueous alkaline solution are prepared, and these aqueous solutions are dropped into an aqueous medium to deposit a coprecipitate of respective metals. Next, the obtained coprecipitate is subjected to filtration, washed with water, dried, and is then subjected to heat treatment in a range of 100 to 500° C., and thus the intended ultrafine particulate complex oxide containing Co, Mn, and Cu can be obtained. As the salt of each metal for use in the preparation of aqueous solutions of respective metal salts to be used above, any of commercially available metal salts can be used, and for example, sulfates, nitrates, chlorides, and the like can be used. In addition, as the alkali for use in the above-described preparation of the aqueous alkaline solution, general alkalis such as caustic soda, soda ash, and sodium bicarbonate can be used. With respect to the ratio of each metal to be mixed, a range of 40 mol % or less for Co, a range of 30 to 70 mol % for Mn, and a range of 25 to 45 mol % for Cu are suitable in terms of a molar ratio relative to the total moles of respective metals. In addition, with respect to the concentration of the aqueous solution of each metal salt, a range of approximately 5 to approximately 50% by mass is appropriate.

With respect to the precipitation condition, when the precipitation pH is adjusted in a pH range where each transition metal precipitates, a fine precipitate can be deposited, and the pH in a range of approximately 5 to approximately 14 is suitable. In addition, according to studies conducted by the present inventors, the reaction property during the heat treatment in a later step can be made to be advantageous by accelerating the oxidation in the liquid phase in depositing the precipitate. Therefore, bubbling through aeration and addition of an oxidizing agent are effective. As the oxidizing agent that can be used for the above-described purpose, sodium chlorate, sodium hypochlorite, potassium salts thereof, hydrogen peroxide, and the like can be used. The shape of the precipitate obtained above is close to an amorphous shape, but a heat treatment is effective for stabilizing the properties, and a range of 100 to 500° C. is preferable as the heat treatment temperature. It is not preferable that the heat treatment temperature is too high because the specific surface area of the oxide particle to be obtained decreases to reduce the number of adsorption sites, so that the treatment ability of the oxide particle to be obtained is lowered when the oxide particle is used for purification of a harmful substance-containing liquid. The complex oxide of Co, Mn, and Cu obtained in the manner as described above preferably has an average particle diameter of 0.1 μm or less. The BET specific surface area is desirably 80 m²/g or more, further desirably 100 m²/g or more.

Next, preparation of the oxide of Co will be described, but is basically similar to the above-described preparation of the complex oxide. Firstly, an aqueous solution of a salt of a metal of Co and an aqueous alkaline solution are prepared, and these aqueous solutions are dropped into an aqueous medium to deposit a precipitate of Co. Next, the obtained precipitate is subjected to filtration, washed with water, dried, and is then subjected to a heat treatment in a range of 100 to 800° C. to obtain the intended ultrafine particulate oxide containing Co. As the salt of a metal of Co for use in the preparation of the oxide of Co, any of commercially available metal salts can be used, and sulfates, nitrates, chlorides, and the like can be used. In addition, as the alkali to be used, general alkalis such as caustic soda, soda ash, and sodium bicarbonate can be used. In addition, with respect to the concentration of the metal salt, a range of approximately 5 to approximately 50% by mass is suitable. With respect to the precipitation condition, when the precipitation pH is adjusted in a pH range where a metal of Co precipitates, a fine precipitate can be deposited, and the pH in a range of approximately 5 to approximately 14 is appropriate. The shape of the obtained precipitate is close to an amorphous shape, but part of the obtained precipitate is crystallized, and further, a heat treatment is effective for stabilizing the properties, and a range of 100 to 800° C. is preferable as the heat treatment temperature. It is not preferable that the heat treatment temperature is too high because the specific surface area of the oxide particle to be obtained decreases to reduce the number of adsorption sites, so that the treatment ability of the oxide particle to be obtained is lowered when the oxide particle is used for purification of a harmful substance-containing liquid. The oxide of Co obtained in the manner as described above preferably has an average particle diameter of 0.1 μm or less. The BET specific surface area is desirably 80 m²/g or more, further desirably 100 m²/g or more.

The above-described transition metal-containing oxide for use in the present invention can also be produced by a so-called "dry-mixing method" in which oxides, carbonates, basic carbonates, and oxalates of respective metals are combined and dry-mixed, and the resultant mixture is then fired when the BET specific surface area of the transition metal-containing oxide is not taken into consideration. However, the mixed raw material of the oxides and the like of the respective metals has a large primary particle diameter, so that the particle diameter of a powder obtained by performing firing after the dry-mixing is limited to sub-micron meters at the smallest, and the oxide having a particle diameter of sub-micron meters or less is hard to produce. Therefore, the powder has a specific surface area of about several m² and has a small number of adsorption sites, so that a transition metal-containing oxide having a BET specific surface area of 80 m² or more specified in the present invention cannot be produced. In contrast, from the transition metal-containing oxide obtained by the above-described "wet process", an ultrafine particle having a particle diameter of 0.02 to 0.1 μm, for example, having a particle diameter of about 0.05 μm, is obtained, and, according to circumstances, the transition metal-containing oxide having a specific surface area of exceeding 100 m² can be made by the above-described wet process, and therefore the transition metal-containing oxide obtained by the above-described wet process is extremely useful for the method for performing a purification treatment on a harmful substance-containing liquid according to the present invention.

The present inventors have found in conducting tests of adsorbing dissolved ozone that the above-described particular adsorbent adsorbs dissolved ozone efficiently, and besides, the harmful substance as an object of treatment can be detoxified by adsorbed ozone in a highly efficient manner, and the present invention is based on the finding. That is, when a mixed solution containing a harmful substance and dissolved ozone is allowed to flow in the presence of an adsorbent comprising a transition metal-containing oxide that characterizes the present invention to make the mixed solution and the adsorbent coexist, dissolved ozone and the harmful substance in the mixed solution are adsorbed to the adsorbent, so that the oxidative decomposition of the harmful substance in the mixed liquid by ozone obtained through the adsorption of dissolved ozone progresses efficiently to obtain a remarkable effect according to the present invention.

When an accelerated reaction of ammonia by dissolved ozone is taken as an example, the oxidative decomposition mechanism as described below is possible although the present invention is not limited to the oxidative decomposition mechanism.

The oxidative decomposition reaction in a liquid phase by dissolved ozone in a liquid progresses in direct proportion to the product of the dissolved ozone concentration in a mixed solution [$O_3$] and the harmful substance concentration [$NH_4OH$], [$O_3$].[$NH_4OH$]. On the other hand, in an adsorbent phase that constitutes the present invention, dissolved ozone and the harmful substance are adsorbed selectively and simultaneously, and therefore the dissolved ozone concentration [$O_3$] and the harmful substance concentration [$NH_4OH$] in the adsorbent each reach at a level that is about 10 to about 100 times higher than those in a mere liquid phase where the adsorbent does not exist. Accordingly, the product [$O_3$].[$NH_4OH$] at the surface of the adsorbent is anticipated to reach at a level about 100 to about 10000 times larger than that in the liquid phase.

In addition, as a strong point that should be mentioned specially in the present invention, $HNO_3$ and $HNO_2$, which are produced in the conventional oxidative decomposition of $NH_4OH$ using a digesting bacterium, are hardly produced in the $NH_4OH$—$O_3$ reaction on the transition metal particulate material that characterizes the present invention.

That is, it is considered that the reaction between ozone and ammonia on the adsorbent that characterizes the present invention is constituted from at least one of (1) to (4) described below. According to studies conducted by the present inventors, in the method for performing a purification treatment according to the present invention, it has been ascertained that the selectivity of reaction exists in the order of (1), (2)>>(3), (4), and $HNO_3$ and $HNO_2$ are hardly produced.

$$NH_4OH+5/6O_3 \rightarrow 1/2N_2+5/2H_2O \qquad (1):$$

$$2NH_4OH+7/3O_3 \rightarrow 2NO+5H_2O \qquad (2):$$

$$NH_4OH+4/3O_3 \rightarrow HNO_3+2H_2O \qquad (3):$$

$$NH_4OH+O_3 \rightarrow HNO_2+2H_2O \qquad (4):$$

The adsorbent that characterizes the present invention can be used singly or in a form of a mixture according to the purpose of the use, and, for example, can be used as it is as an ultrafine particle. Alternately, the adsorbent that characterizes the present invention can be used by being molded into an arbitrary shape such as a granular form, a pellet form, a Raschig ring form, or a honeycomb form. For example, it is preferable that the constitution be such that the high silica adsorbent which is used in conventional techniques, which adsorbs ozone, and which adsorbs a harmful substance is shaped into a honeycomb form, and the ultrafine particulate powder of the transition metal-containing oxide obtained as described above is carried on the resultant high silica adsorbent.

The amount of the adsorbent that characterizes the present invention to be used is different according to the purpose of the use. For example, in the case where a system in which a water-soluble oxidizing agent such as an oxygen-containing halogenated compound or hydrogen peroxide is used together with dissolved ozone is used, the amount of the adsorbent to be used is about 1 to about 250 (1/h) in terms of an SV value being a flow rate per 1 $m^3$ of the adsorbent [$m^3$/h] under conditions of 1 to 1000 ppm (w/w) of a usual contamination substance and 1 to 10000 ppm (w/w) of an amount of the mixed solution containing the water-soluble oxidizing agent and dissolved ozone. The performance of the adsorbent that characterizes the present invention is different according to the purpose of the use, but exhibits an extremely high removal ratio, as high as 80% or more as will be described later.

According to the studies conducted by the present inventors, in the liquid phase, dissolved ozone frequently decomposes without contributing to detoxification due to a collision with a third substance other than the harmful substance, and therefore there has been a limit to the efficiency of detoxification by dissolved ozone. However, in the detoxification treatment, which has been enabled by using the adsorbent that characterizes the present invention, on a harmful substance with dissolved ozone at the surface of the adsorbent, dissolved ozone and the harmful substance are selectively adsorbed to the adsorbent, and therefore the probability of the decomposition of dissolved ozone due to a collision with the third substance is greatly reduced, and dissolved ozone is consumed selectively and efficiently for the detoxification of the harmful substance.

In the conventional methods in which the efficiency of the detoxification treatment of a harmful substance in a liquid phase is poor (for example, treatment making use of biological activity with digesting bacterium), the volume of an apparatus is large, so that there has always been concern that the activity of a digesting bacterium is considerably lowered by the variation in a liquid composition and invasion of a competitive microorganism, and needs for improving economy and maintainability has been strong. The treatment of wastewater through the homogeneous liquid phase reaction of the oxidation reaction in a solution containing a water-soluble oxidizing agent for harmful substances or in a mixed solution containing the water-soluble oxidizing agent and dissolved ozone, which is previously taken as a conventional technique, has an extremely low efficiency, and therefore has not been adopted singly, but has been adopted as a general later flow treatment in treatments making use of biological activity for the purpose of reducing COD components. However, such installment for a treatment making use of biological activity on an upstream has not been adopted because there is concern that deterioration in performance of a biologically active tank due to dissolved ozone that has leaked. In contrast, in the method for performing a purification treatment on a harmful substance-containing liquid according to the present invention, dissolved ozone which is unreacted is retained in a state of being adsorbed to the adsorbent that characterizes the present invention, so that there is little risk of leakage to a later flow, and according to the studies conducted by the present inventors, the concentration of dissolved ozone that leaks is 1/10 times or less of the concentration in the conventional techniques, so that a decomposer layer for decomposing dissolved ozone that leaks is not necessarily provided.

However, even in the present invention, a decomposer layer for decomposing dissolved ozone that leaks is preferably provided at a treated liquid outlet port part of the adsorbent-packed bed for performing a detoxification (purification) treatment with dissolved ozone as a measure in the case where a large amount of dissolved ozone is added for sterilization or the like of a particular bacterium, or in the case where dissolved ozone which is unreacted leaks for some reason or other. By constituting the adsorbent-packed bed in this way, dissolved ozone which is unreacted can be decomposed surely. Examples of the decomposer, which is used in this case, for the dissolved ozone-containing mixed solution include consumable type adsorbents, such as activated carbon and an alumina-based compound, which are oxidized into $CO_2$ when coming into contact with dissolved ozone that has leaked. It is to be noted that the decomposer layer may be provided inside the outlet port part of the adsorbent-packed bed, or may be provided separately outside the packed bed. In the method for performing a purification treatment on a harmful substance-containing liquid according to the present invention, the concentration of dissolved ozone that leaks is low as described previously, and therefore the frequency of exchanging dissolved ozone can be greatly prolonged such that it becomes about 10 times longer than that in the conventional techniques to make an economical treatment possible.

It is to be noted that, if necessary, a filtration material layer for removing dust in a liquid on the upstream side of an injection point where the dissolved ozone-containing mixed solution is injected into a harmful substance-containing liquid and/or the later flow side of an adsorption reactor (adsorbent-packed bed) for the dissolved ozone-containing mixed solution. Whether to install the filtration material layer or not, the position of the filtration material layer, and the like may be determined appropriately according to the status of the apparatus, the characteristics of the harmful substance-containing liquid, and the like.

Figure 1:
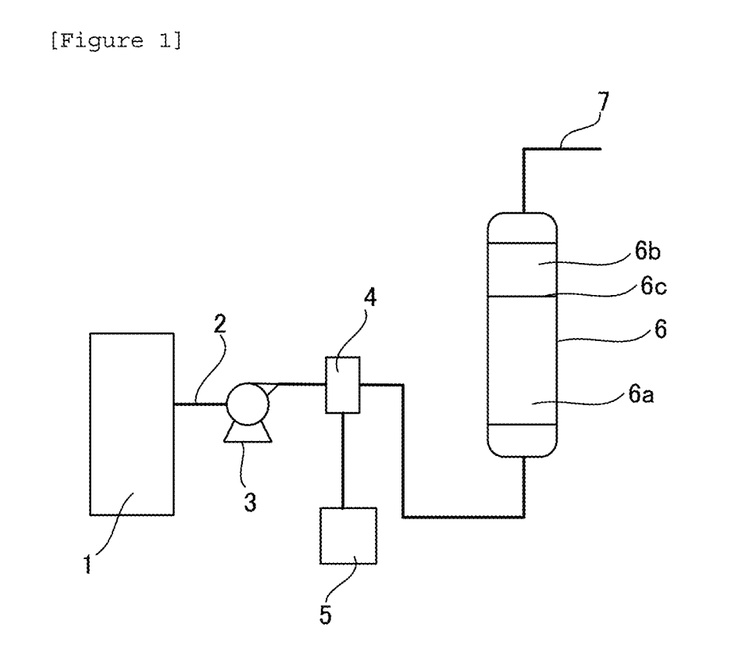
FIG. 1 shows a schematic outline diagram illustrating one example of a treatment flow in a method for performing a purification treatment according to the present invention.

Next, the treatment apparatus according to the present invention will be described with reference to the accompanying drawings. FIG. 1 shows one example of a harmful substance-containing liquid treatment flow in which the method for performing a purification treatment on a harmful substance-containing liquid according to the present invention is applied to a treatment of waste liquid from industrial wastewater. In FIG. 1, a harmful substance-containing liquid from a main plant 1 is fed into a mixer 4 where the harmful substance-containing liquid is mixed with dissolved ozone through a waste liquid leading-out piping 2 by a waste liquid transportation pump 3, and ozone from an ozone generator 5 is injected into the harmful substance-containing liquid to be introduced into the adsorbent-packed bed 6 as dissolved ozone-containing wastewater. In the adsorbent-packed bed 6, a particular adsorbent that characterizes the present invention is packed, the harmful substance and dissolve ozone in the introduction liquid are co-adsorbed to the adsorbent, and the harmful substance reacts in a state of being in a high concentration to be subjected to oxidative decomposition by ozone. Usually, the leakage of dissolved ozone into a treated liquid on which the treatment has been performed and which is discharged from a treated liquid discharge piping 7 does not occur, but, if necessary, a layer of a dissolved ozone decomposer such as activated carbon may be provided on the outlet port side inside the adsorbent-packed bed 6 or in a later flow of the adsorbent-packed bed 6. It is to be noted that FIG. 1 illustrates an example in which a dissolved ozone decomposer layer 6b is provided on the treated liquid outlet port side of the adsorbent layer 6a inside the adsorbent-packed bed 6 through a partition 6c. The dissolved ozone decomposer layer 6b comprises a water-soluble oxidizing agent, or comprises a mixed solution containing a water-soluble oxidizing agent and dissolved ozone.

EXAMPLES

Hereinafter, the present invention will be described in more detail giving Examples, Comparative Examples, and Reference Examples. In the description, "parts" and "%" are on a mass basis unless otherwise noticed.

Examples 1 to 4, Comparative Example 1, and Reference Example 1

A test of performing a purification treatment with dissolved ozone on trichlorobenzene in a liquid was conducted using a test apparatus in the flow chart illustrated in FIG. 1 (however, decomposer layer 6b for decomposing dissolved ozone that had leaked was not provided). Adsorbents used are shown in Table 1. In addition, the constitution of the apparatus, test conditions, and the like are shown in Table 2. Specifically, a purification treatment was performed on a simulated waste liquid containing 10 ppm of trichlorobenzene setting the mass ratio of dissolved ozone to trichlorobenzene to be 1.5. The trichlorobenzene concentration and the dissolved ozone concentration in each treated liquid taken as a sample at a part of the treated liquid discharge piping 7 illustrated in FIG. 1 were measured, and each measurement result is shown in Table 3 as concentration at outlet port.

As the adsorbent, 5 types of adsorbents of S-1 to S-5 described below were used. As "S-1", only a base material made of Ultra-Stable Y-type Zeolite (hereinafter, abbreviated as USY) (ratio of $SiO_2/Al_2O_3$ of 200) being a high silica zeolite, the base material having a honeycomb structure, was used to carry out Comparative Example 1. The honeycomb structure had a plate thickness of 0.2 mm and a pitch of 2 mm, and the shape of the adsorbent was cylindrical. An ultrafine particle of an oxide of Co (particle diameter of 0.02 µm, specific surface area of 100 $m^2/g$) was carried on the above-described honeycomb base material, and the resultant adsorbent was used as "S-2" to carry out Example 1. An ultrafine particle of a complex oxide of Co, Mn, and Cu (composition of Co:Mn:Cu=0.2:0.7:0.4 (molar ratio)) was carried on the above-described honeycomb base material, and the resultant adsorbent was used as "S-3" to carry out Example 2. As (S-4), the "5-1" was used at a front, the "S-2" was used at a rear, and these were packed (volume ratio of 1:1) and used as the adsorbent to carry out Example 3. As "S-5", the "5-1" was used at a front, the "S-3" was used at a rear, and these were packed (volume ratio of 1:1) and used as the adsorbent to carry out Example 4. Further, in addition to the above-described examples, a treatment was performed as "S-6" in an unpacked state without using an adsorbent, and this treatment constitutes Reference Example 1.

The ultrafine particles used above were each prepared in the manner as described below. With respect to the preparation of the ultrafine particle of the oxide of Co, which constitutes "S-2", firstly, an aqueous solution of cobalt sulfate in which 56.8 parts of cobalt sulfate was dissolved in 100 parts of water for dissolution was prepared. Next, an aqueous alkaline solution in which 25 parts of soda ash was dissolved in 100 parts of water for dissolution was prepared as an alkaline solution. These aqueous solutions were dropped under stirring into 210 parts of water for precipitation prepared in advance, and the pH after the dropping was adjusted to 7 to prepare a precursor of the intended oxide of Co. The obtained precursor of the oxide of Co was then washed with water, dried, and then subjected to a heat treatment at 300° C. to obtain the intended ultrafine particle of the oxide of Co. The obtained ultrafine particle of the oxide of Co had a particle diameter of 0.02 µm and a BET specific surface area of 100 $m^2/g$.

The ultrafine particle of the complex oxide of Co, Mn, and Cu (composition of Co:Mn:Cu=0.2:0.7:0.4 (molar ratio), which constitutes "S-3", was prepared using an aqueous solution containing a mixed salt almost in the same manner as in the procedure of preparing "S-2". Specifically, the aqueous solution containing a mixed salt was prepared by dissolving 34.9 parts of copper sulfate, 44 parts of manganese sulfate, and 18.3 parts of cobalt sulfate in 300 parts of water for dissolution. The aqueous alkaline solution as a precipitant was prepared by dissolving 42.6 parts of caustic soda in 320 parts of water for dissolution. These aqueous solutions were dropped under stirring into 270 parts of water for precipitation prepared in advance, and the pH after the dropping was adjusted to 12.5 to prepare a precursor of the intended ultrafine particle of the complex oxide of Co, Mn, and Cu. In preparing the ultrafine particle of the complex oxide of Co, Mn, and Cu, 24 parts of hydrogen peroxide diluted to 35% was added for accelerating the oxidation in the liquid phase. The obtained precursor was washed with water, dried, and then subjected to a heat treatment at 300° C. to obtain the intended ultrafine particle of the complex oxide of Co, Mn, and Cu. The obtained ultrafine particle of the complex oxide of Co, Mn, and Cu had a particle diameter of 0.05 µm and a specific surface area of 200 $m^2/g$.

The adsorbents, "S-2" and "S-3", were each obtained using the cylindrical base material being made of USY and having the same honeycomb structure as in the constitution of "5-1" by carrying the ultrafine particle of the oxide of Co for "S-2" and the ultrafine particle of the complex oxide of Co, Mn, and Cu for "S-3", each obtained in the manner as described above, on the base material. The adsorbents thus obtained, "S-2" and "S-3", were each used in the form as shown in Table 1 to be provided for a performance evaluation test. In Table 1, an outline of the constitution for each adsorbent used for the performance evaluation test (purification treatment test) is shown. In addition, the constitution of the apparatus, the test condition, and the like used in the performance evaluation test are shown in Table 2.

TABLE 1

Outline of adsorbents used for treatment

| Adsorbent No. | Adsorbent (shape: honeycomb base material, or ultrafine particle is carried on the base material) |
|---|---|
| S-1 (Comparative Example 1) | Only base material made of USY (ratio of $SiO_2/Al_2O_3$: 200) |
| S-2 (Example 1) | Ultrafine particle of oxide of Co is carried |
| S-3 (Example 2) | Ultrafine particle of oxide of (Co + Mn + Cu) (composition ratio of Co:Mn:Cu = 0.2:0.7:0.4) is carried |
| S-4 (Example 3) | USY is carried at front, and ultrafine particle of oxide of Co is carried at rear (volume ratio of 1:1) |
| S-5 (Example 4) | USY is carried at front, and ultrafine particle of oxide of (Co + Mn + Cu) is carried at rear (volume ratio of 1:1) |
| S-6 (Reference Example 1) | Not packed (treatment without adsorbent) |

TABLE 2

Treatment apparatus and treatment condition

|  |  | [Unit] |
| --- | --- | --- |
| Specification of adsorbent-packed bed | | |
| Diameter of bed |  | 0.4 mφ |
| Height of layer |  | 0.5 m |
| Adsorbents and amount packed | S-1 to S-6 in Table 1 | 62.8 L |
| Superficial velocity |  | 0.5 cm/sec |
| Amount of liquid treated |  | 2.3 m³/h |
| SV value |  | 36 1/h |
| Treatment condition | | |
| Treated substance and concentration | Trichlorobenzene | 10 ppm (w/w) |
| Reaction temperature |  | 25 °C. |
| Dissolved ozone concentration |  | 15 ppm (w/w) |
| Mass ratio of O₃/treated substance |  | 15 (w/w) |

Evaluation test results are shown in Table 3. As described previously, in the evaluation test, the simulated waste liquid containing 10 ppm of trichlorobenzene was used as the object of the treatment, and the purification treatment was performed by adding dissolved ozone into the waste liquid so that the dissolved ozone concentration was 15 ppm and the mass ratio of the dissolved ozone to trichlorobenzene was set to be 1.5. In the evaluation, the trichlorobenzene concentration and the ozone concentration in a treated liquid taken as a sample at a part (outlet port part) of the treated liquid discharge piping 7 illustrated in FIG. 1 were measured to calculate a ratio of the trichlorobenzene concentration at the outlet port/the trichlorobenzene concentration at the inlet port and a ratio of the $O_3$ concentration at the outlet port/the $O_3$ concentration at the inlet port, thereby determining the trichlorobenzene removal ratio of and the ozone removal ratio, and these values are shown in Table 3. Moreover, the results of Examples and Comparative Examples are relatively evaluated based on the result of Reference Example where the purification treatment was performed by only adding dissolved ozone without using an adsorbent, and the evaluation results obtained according to the criteria described below are shown in Table 3. That is, a removal ratio of 3 times or more larger than the removal ratio in Reference Example 1 is rated as Excellent, a removal ratio of 2.5 times or more larger is rated as Good, and a removal ratio of 2 times or more larger is rated as Fair.

TABLE 3

Evaluation test results

| Sample No. | Concentration at outlet port (ppm) | | Removal ratio (%) | | Evaluation |
| --- | --- | --- | --- | --- | --- |
|  | Trichloro-benzene | Ozone | Trichloro-benzene | Ozone |  |
| S-1 (Comparative Example 1) | 3 | 8 | 70 | 47 | Fair |
| S-2 (Example 1) | 2.5 | 7.5 | 75 | 50 | Good |
| S-3 (Example 2) | 2 | 7 | 80 | 53 | Good |
| S-4 (Example 3) | 1 | 6 | 90 | 60 | Excellent |
| S-5 (Example 4) | 0.5 | 5.5 | 95 | 63 | Excellent |
| S-6 (Reference Example 1) | 1 | 12 | 30 | 20 | Standard |

As shown in Table 3, in the decomposition of trichlorobenzene by dissolved ozone, the trichlorobenzene removal ratio obtained by using any of "S-1" to "S-5" greatly exceeds a trichlorobenzene removal ratio of 30% obtained by using the unpacked bed of Reference Example 1. However, in the decomposition by a high silica zeolite, which is an already-known accelerated oxidation method, the upper limit of the trichlorobenzene removal ratio was about 70%. In terms of the trichlorobenzene removal ratio, "S-2" and "S-3" each being a honeycomb carrying an ultrafine transition metal particle exhibited a trichlorobenzene removal ratio of 75% and 80% respectively, and thus the superiority to the conventional techniques was found. Further, with respect to partial packing in which a high silica zeolite and two kinds of transition metal ultrafine particles are packed, namely, "S-2" or "S-3" is packed in a later flow of the high silica zeolite "S-1", (S-4) exhibited a trichlorobenzene removal ratio of 90%, and "S-5" exhibited a trichlorobenzene removal ratio of 95% to find that the decomposition performance was further improved.

Example 5

Figure 2:
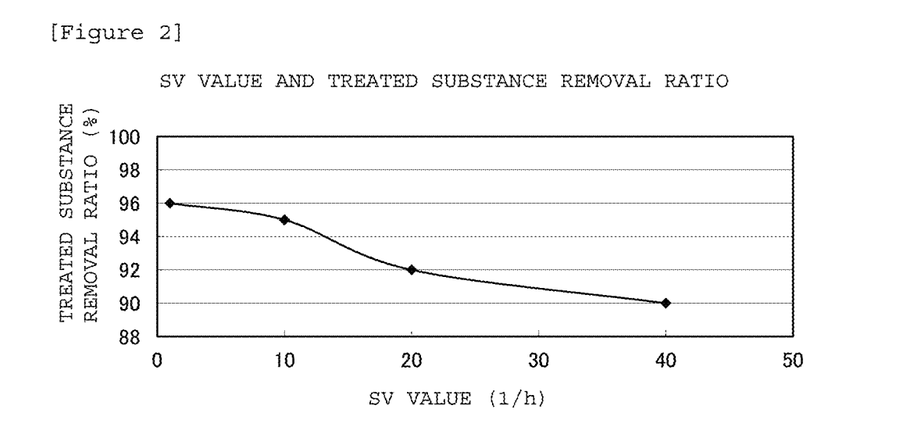
FIG. 2 illustrates a graph showing a relationship between an SV value and a removal ratio of trichlorobenzene as an object of treatment in Example 5.

Purification tests were conducted changing the SV value from 1 to 40 [1/h] under the condition of a reaction temperature of 25° C. and a mass ratio of dissolved ozone/trichlorobenzene of 1.5 (w/w), which is the same as the condition in the previously conducted tests, using the adsorbent constitution of "S-5" which exhibited the highest trichlorobenzene removal ratio in the previously conducted evaluation tests. Evaluation was conducted using the obtained trichlorobenzene removal ratios. In the adsorbent constitution of "S-5", "S-1" was disposed on a front side of the flow of a liquid in the adsorbent-packed bed, and "S-3" was disposed on a rear side so that the volume ratio of the two was 1:1. With respect to the shape of the adsorbent, the adsorbent had a honeycomb structure (plate thickness of 0.2 mm, pitch of 2 mm). As a result, it was ascertained that the removal ratio of trichlorobenzene being a harmful substance as the object of the treatment was 90% or more over the whole range of the SV values from 1 to 40 [1/h] as shown in FIG. 2, and thus the treatment was performed in an extremely high efficiency.

Example 6

Figure 3:
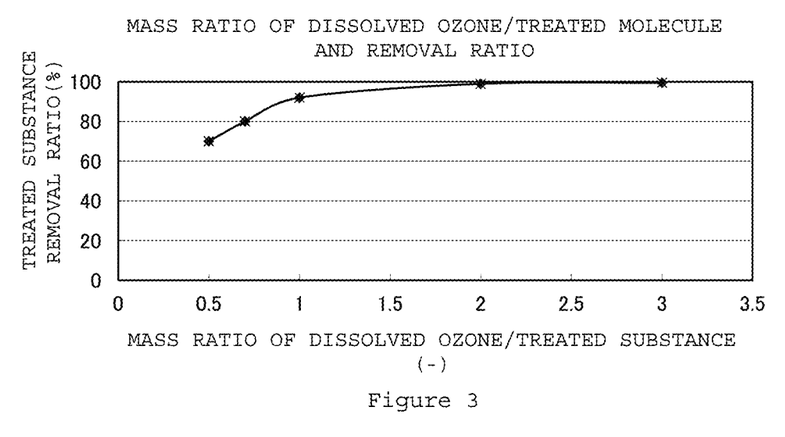
FIG. 3 illustrates a graph showing a relationship between a mass ratio of dissolved ozone to trichlorobenzene as an object of treatment and a trichlorobenzene removal ratio in Example 6.

Purification tests were conducted setting the SV value to be constant at 10 [1/h], changing the amount of dissolved ozone added into trichlorobenzene as the object of the treatment, and using, in the same manner as in Example 5, the adsorbent constitution of "S-5" which exhibited the highest trichlorobenzene removal ratio in the previously conducted evaluation tests. Specifically, evaluation was conducted in terms of the trichlorobenzene removal ratios obtained by changing the mass ratio of dissolved ozone/trichlorobenzene (w/w) from 0.5 to 3. As a result, it was ascertained that the trichlorobenzene removal ratio was 90% or more over the whole range of the mass ratios (w/w) from 1 to 3 as shown in FIG. 3, and the treatment was performed in an extremely high efficiency. Moreover, it was found that, as shown in FIG. 3, a trichlorobenzene removal ratio of 80% is kept under this treatment condition even when the amount of dissolved ozone is reduced to a mass ratio of dissolved ozone/trichlorobenzene of 0.7

Examples 7 to 10, Comparative Example 2, and Reference Example 2

Tests of treating ammonia with dissolved ozone were conducted using the test apparatus illustrated in FIG. 1

(however, decomposer layer 6b for decomposing dissolved ozone that had leaked was not provided). The adsorbents used are the same as those shown in Table 1, and the test condition and the like are the same as those shown in Table 2. That is, in the tests of treating ammonia, a simulated waste liquid containing 10 ppm of ammonia was used as the object of the treatment, and the purification treatment was performed by adding dissolved ozone into the waste liquid so that the dissolved ozone concentration was 15 ppm and the mass ratio of the dissolved ozone to trichlorobenzene was set to be 1.5. With respect to the others, the purification treatment was performed under the condition described in Table 2. Evaluation was conducted in the same manner as in the case of the trichlorobenzene-containing waste liquid, and the ammonia concentration and the ozone concentration in the treated liquid taken as a sample at a part (outlet port part) of the treated liquid discharge piping 7 illustrated in FIG. 1 were measured to calculate the ammonia removal ratio and the ozone removal ratio. The results are shown in Table 4.

TABLE 4

Evaluation test results

| Sample No. | Concentration at outlet port (ppm) | | Removal ratio (%) | | Evaluation |
|---|---|---|---|---|---|
| | Ammonia (NH$_4$OH) | Ozone | Ammonia (NH$_4$OH) | Ozone | |
| S-1 (Comparative Example 2) | 1.5 | 6.5 | 85 | 57 | Good |
| S-2 (Example 7) | 1.2 | 6.2 | 88 | 59 | Good |
| S-3 (Example 8) | 1 | 6 | 90 | 60 | Excellent |
| S-4 (Example 9) | 0.5 | 5.5 | 95 | 63 | Excellent |
| S-5 (Example 10) | 0.2 | 5.2 | 98 | 65 | Excellent |
| S-6 (Reference Example 2) | 9 | 14 | 10 | 7 | Standard |

As can be understood from Table 4, in the decomposition of ammonia by dissolved ozone, the ammonia removal ratio obtained by using any of "S-1" to "S-5" greatly exceeded an ammonia removal ratio of 10% obtained by using the unpacked bed of Reference Example 2. Moreover, in the decomposition in the system of Comparative Example 2, which is already known as a system that accelerates ozone oxidation, using the base material being made of USY and having a honeycomb structure, the ammonia removal ratio was about 85%, and a high decomposition property is also obtained as shown in Table 4. In contrast, as shown in Table 4, "S-2" and "S-3" each being a honeycomb carrying a transition metal ultrafine particle exhibited an ammonia removal ratio of 88% and 90% respectively, and thus the superiority to the system of Comparative Example 2 using the base material being made of USY and having a honeycomb structure in the decomposition of ammonia was ascertained. Further, in Example 9 where "S-4" in which "S-2" was packed in a later flow of the adsorbent "S-1" of Comparative Example 2 comprising the base material being made of USY and having a honeycomb structure was used as the adsorbent, or in Example 10 where "S-5" in which "S-3" was packed in a later flow of the adsorbent "S-1" of Comparative Example 2 comprising the base material being made of USY and having a honeycomb structure was used as the adsorbent, "S-4" exhibited an ammonia removal ratio of 95%, and "S-5" exhibited an ammonia removal ratio of 98%, and thus it was found that the performance of decomposing ammonia by ozone was further improved. With respect to the evaluation, an ammonia removal ratio of 90% or more was rated as Excellent, and an ammonia removal ratio of 80% or more was rated as Good.

REFERENCE SIGNS LIST

1: Main Plant
2: Waste liquid leading-out (supply) piping
3: Waste liquid transportation pump
4: Mixer with dissolved ozone
5: Dissolved ozone generator
6: Adsorbent-packed bed
6a: Adsorbent layer
6b: Decomposer layer comprising water-soluble oxidizing agent or comprising mixed solution containing water-soluble oxidizing agent and dissolved ozone
6c: Partition
7: Treated liquid discharge piping

The invention claimed is:

1. A method for performing a purification treatment on a harmful substance-containing liquid, the method comprising:
   adding and mixing dissolved ozone with a harmful substance-containing liquid containing a harmful substance;
   thereafter flowing the resulting harmful substance-containing liquid comprising the ozone to contact a transition metal-containing oxide, so that oxidation of the harmful substance with the dissolved ozone is accelerated, thereby performing oxidative decomposition of the harmful substance in the harmful substance-containing liquid,
   wherein the transition metal-containing oxide is a complex oxide of Co, Mn, and Cu, or an oxide of Co,
   the transition metal-containing oxide is in a form of an ultrafine particle having an average particle diameter in a range of 0.1 μm or smaller and has a BET specific surface area in a range of 80 m$^2$/g or more, and
   the transition metal-containing oxide adsorbs ozone and the harmful substance.

2. The method for performing a purification treatment on a harmful substance-containing liquid according to claim 1, wherein the ultrafine particle of the transition metal-containing oxide is formed by using a precipitate, and the precipitate is produced by mixing (a) an aqueous solution comprising a metal salt of Co, or (b) a mixed aqueous solution comprising metal salts of Co, Mn, and Cu, with an alkaline solution.

3. The method for performing a purification treatment on a harmful substance-containing liquid according to claim 1, wherein the transition metal-containing oxide is carried on a high silica adsorbent in a honeycomb form.

4. The method for performing a purification treatment on a harmful substance-containing liquid according to claim 1, the method further comprising:
   disposing a high silica adsorbent, which adsorbs both the harmful substance and the dissolved ozone, at an upstream side or a downstream side relative to the transition metal-containing oxide, so that the harmful substance-containing liquid is brought into contact with the high silica adsorbent; and
   allowing the harmful substance-containing liquid to flow contacting the high silica adsorbent.

5. The method for performing a purification treatment on a harmful substance-containing liquid according to claim 3, wherein the high silica adsorbent comprises at least one material selected from the group consisting of a high silica pentasil zeolite, a dealuminized faujasite, and a mesoporous silicate.

6. A harmful substance-containing liquid purification treatment apparatus that carries out the method for performing a purification treatment on a harmful substance according to claim 1, the apparatus comprising:
- an adsorbent-packed bed comprising at least the transition metal-containing oxide in a form of a single substance or a mixture disposed therein;
- a supply piping that supplies the harmful substance-containing liquid into the adsorbent-packed bed;
- a dissolved ozone generator that adds the dissolved ozone into the harmful substance-containing liquid, wherein the dissolved ozone generator is connected to the supply piping; and
- a treated liquid discharge piping that discharges a treated liquid as a resulting liquid of the purification treatment, from the adsorbent-packed bed.

7. The harmful substance-containing liquid purification treatment apparatus according to claim 6,
wherein the form of a single substance or a mixture of the transition metal-containing oxide disposed inside the adsorbent-packed bed is at least one form selected from the group consisting of the ultrafine particle form, a granular form, a pellet form, a Raschig ring form, and a honeycomb form.

8. The method for performing a purification treatment on a harmful substance-containing liquid according to claim 1,
wherein the harmful substance-containing liquid is at least one liquid selected from the group consisting of wastewater having a value of a chemical oxygen demand specified by the Environmental Agency in the chemical oxygen demand regulation, and water containing one or more malodorous substances in a culture tank.

9. The method for performing a purification treatment on a harmful substance-containing liquid according to claim 8,
wherein the malodorous substance in a culture tank is ammonia.

* * * * *